United States Patent [19]

Shimizu et al.

[11] Patent Number: 5,659,828
[45] Date of Patent: Aug. 19, 1997

[54] CAMERA

[75] Inventors: Tokuo Shimizu, Hachioji; Yasushi Odanaka, Hino, both of Japan

[73] Assignee: Olympus Optical Co., Ltd., Tokyo, Japan

[21] Appl. No.: 362,131

[22] Filed: Dec. 22, 1994

[30] Foreign Application Priority Data

Dec. 30, 1993 [JP] Japan .................................. 5-351085
Jan. 17, 1994 [JP] Japan .................................. 6-003099

[51] Int. Cl.$^6$ ......................................................... G03B 1/18
[52] U.S. Cl. ................................................................ 396/388
[58] Field of Search ............................ 354/173.1; 396/388

[56] References Cited

FOREIGN PATENT DOCUMENTS

| 57728 | of 1989 | Japan . |
| 57738 | of 1989 | Japan . |
| 303420 | of 1989 | Japan . |
| 93723 | of 1989 | Japan . |
| 84531 | of 1991 | Japan . |
| 50837 | of 1992 | Japan . |

*Primary Examiner*—Safet Metjahic
*Assistant Examiner*—Daniel Chapik
*Attorney, Agent, or Firm*—Louis Weinstein

[57] ABSTRACT

In a camera dedicated to a film feed type Patrone, one end of a spool axis of the Patrone or of an axis coupled with the spool axis is bared on the outer surface of the camera so that the spool axis can be driven externally. Bared contacts are provided to externally detect conditions within the camera.

10 Claims, 8 Drawing Sheets

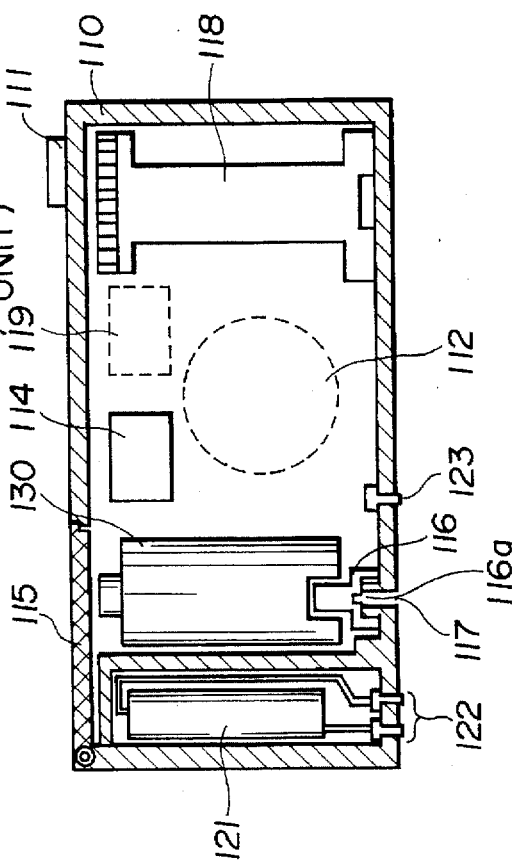
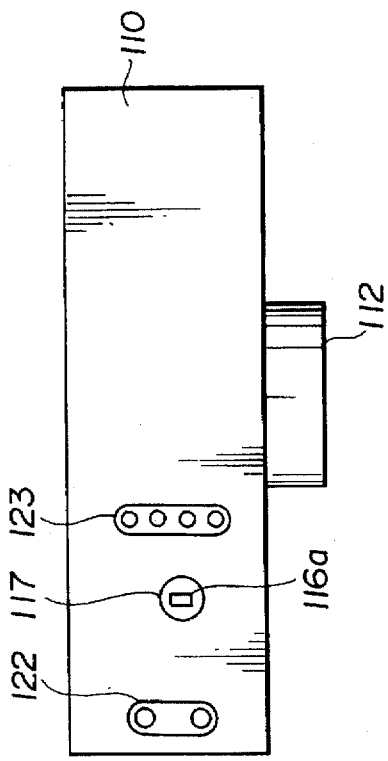
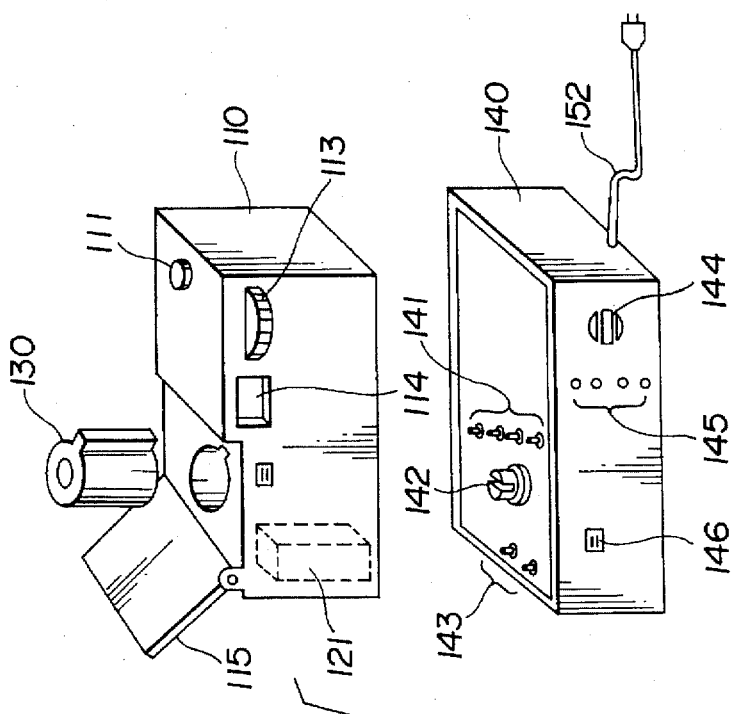

1

CAMERA

BACKGROUND OF THE INVENTION

1. Field of the Invention

The present invention relates to a camera, and more particularly, to a camera dedicated to a film feed type Patrone.

2. Description of the Related Art

In the past, a proposal has been made for a camera dedicated to a so-called film feed type Patrone of which a leader does not come out and which differs from a Patrone containing rolled film conformable to Japanese Industrial Standard JIS-135. In this kind of camera, a mechanism for rotating a Patrone axis in a feed direction is incorporated in a camera body.

However, according to the foregoing prior art, the incorporation of the mechanism for rotating the Patrone axis in the feed direction makes it a must to feed or rewind film by rotating the Patrone axis forwardly or reversely. For adopting a technique of rotating a take-up spool simultaneously with the rotation for film feed, a difference in rotating speed must be made between these rotations. For adopting a technique of alternately effecting the rotation for film feed and the rotation of the take-up spool, a planetary clutch mechanism must be included for the purpose of alternately effecting the rotations.

Consequently, the film feed drive mechanism for a camera becomes complex and the number of component parts of a camera increases. This results in a larger camera and higher cost.

In recent years, a film unit with a lens, in which photographic film and a strobe are placed in advance and which possesses the capability of simple photography, has been put on the market. Thanks to the film unit with a lens, even a person who does not carry a camera with him/her can enjoy photography readily. The film unit with a lens obviates the necessities of loading film, rewinding film after completion of photography, and unloading exposed film.

In this kind of camera, both a camera body and a built-in strobe unit are shielded by a housing. Electrodes of an AA battery for use in charging the strobe are wired by performing soldering (Refer to Japanese Unexamined Utility Model Publication Nos.1-57728 and 1-57738).

Japanese Patent Laid-Open No.1-93723 has disclosed an art of reminding a photographer to take back a battery, wherein a Patrone chamber and a strobe battery chamber are designed to share an opening.

In another art disclosed, a camera is provided with a strobe synchronization access port through which a strobe unit can be detachably connected to the camera (Japanese Patent Laid-Open No.1-303420).

Japanese Unexamined Utility Model Publication No.4-50837 has disclosed an idea of putting a battery for supplying power to a strobe or the like in a core of a roll of unexposed film.

Recently, a camera dedicated to a Patrone having a feed function has been proposed in Japanese Patent Laid-Open No.3-84531.

With the tendency toward electronics-oriented cameras, more and more cameras are in need of a large-capacity power supply. In general, an AA battery is employed. The large size of this type of battery is one of the factors hindering materialization of more compact cameras.

After being exposed, a film unit with a lens is presented to a photo agent or a photo processing shop as it is. The photo processing shop first removes an internal camera from the housing of the film unit and then unloads a filmstrip from the camera. The filmstrip is then developed. The Japanese Unexamined Utility Model Publication No.1-57728 and the Japanese Patent Laid-Open No.1-93723 consider it a precondition to dispose of a used camera body. A battery for a built-in strobe that is an AA battery must therefore be disposed of irrespective of the frequency of flashing the strobe. This is waste of resources, resulting in an increase in price of a camera itself.

From this viewpoint, a camera body may be designed to be recycled. In this case, the interval of replacing a battery must be varied depending on the amount of use of a strobe or the number of exposed frames. This necessitates a battery cover through which a battery is replaced and a lock member for detachably locking a cover. Moreover, a means for preventing a battery from being loaded upside down is required. This leads to an increase in cost. Due to the necessity of replacing a battery, the location of a battery chamber becomes a bottleneck that must be cleared in designing a camera and laying out components. Moreover, a dry battery such as an AA battery cannot help but be employed in terms of availability. Restrictions are imposed even in the aspects of spaces and shapes.

OBJECTS AND SUMMARY OF THE INVENTION

A first object of the present invention is to provide a compact and inexpensive camera dedicated to a film feed type Patrone.

A second object of the present invention is to provide a film unit with a lens enabling saving of resources, permitting a reduction in the cost required for replacing a battery, and offering freedom in laying out internal mechanical components.

A third object of the present invention is to provide a camera capable of checking shutter action, strobe action, film feed, and light leakage.

A fourth object of the present invention is to provide a camera that can determine whether photography is completed and that when photography is completed, refrains from feeding film or sounds an alarm.

A fifth object of the present invention is to provide a camera that can determine whether film feed is completed and that when film feed is completed, refrains from feeding film or sounds an alarm.

A sixth object of the present invention is to provide a camera that is compact and lightweight, is low in cost, and has excellent portability.

Briefly, in a camera dedicated to a film feed type Patrone in accordance with the present invention, one end of a spool axis of the Patrone or an axis coupled to the spool axis is bared on the outer surface of a camera so that the spool axis can be driven externally.

The above as well as other objects and advantages of the present invention will be further apparent from the detailed description below.

BRIEF DESCRIPTION OF THE DRAWINGS

FIG. 9 is an oblique view showing the appearances of a camera in accordance with the fourth embodiment of the present invention and of a drive unit for the camera viewed from the backs of the camera and drive unit;

FIG. 10 is a sectional view showing major components of the camera of the fourth embodiment;

FIG. 11 is a bottom view showing the camera of the fourth embodiment;

DETAILED DESCRIPTION OF THE PREFERRED EMBODIMENTS

Figure 1:
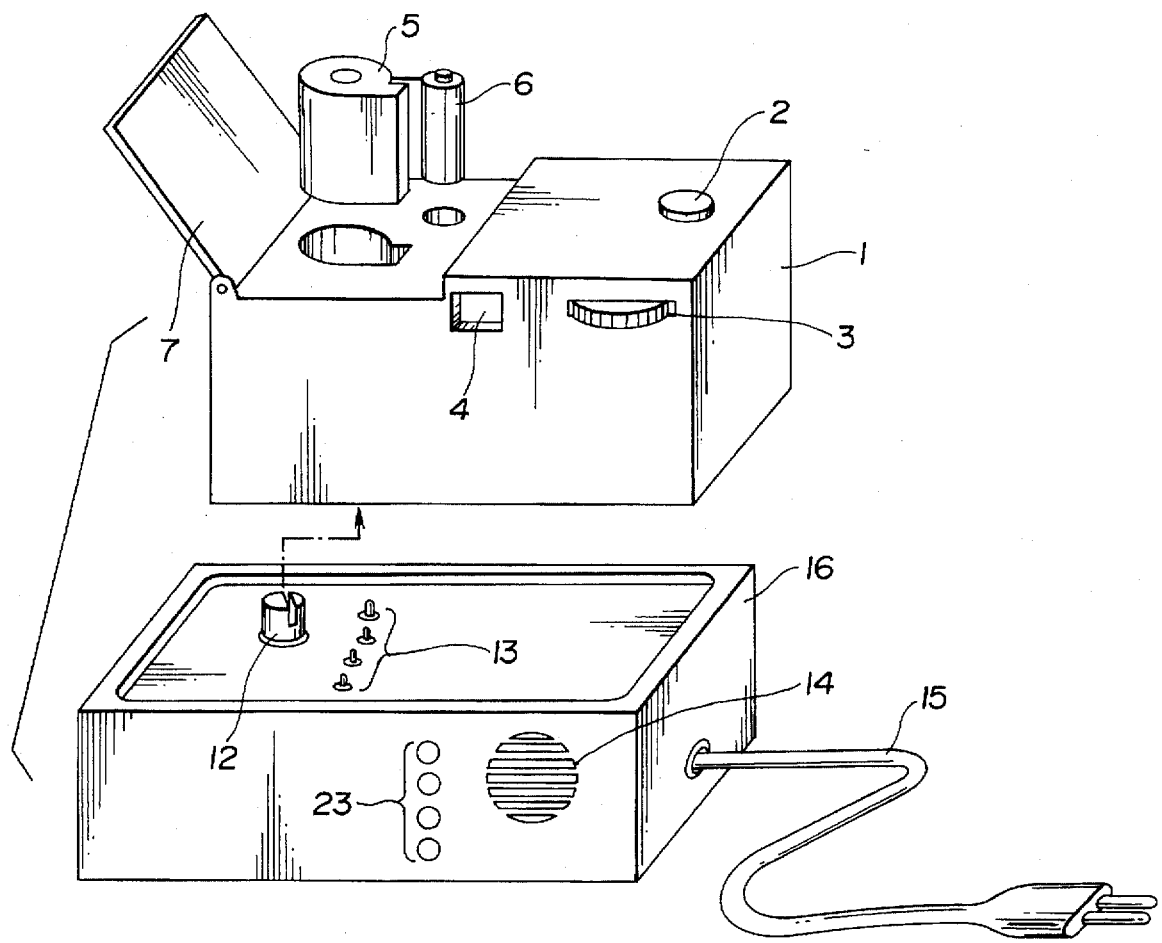
FIG. 1 is an oblique view showing the appearances of a camera in accordance with the first embodiment of the present invention and a drive unit for the camera viewed from the backs of the camera and drive unit.

Referring to the drawings, embodiments of the present invention will be described below.

Figure 2:
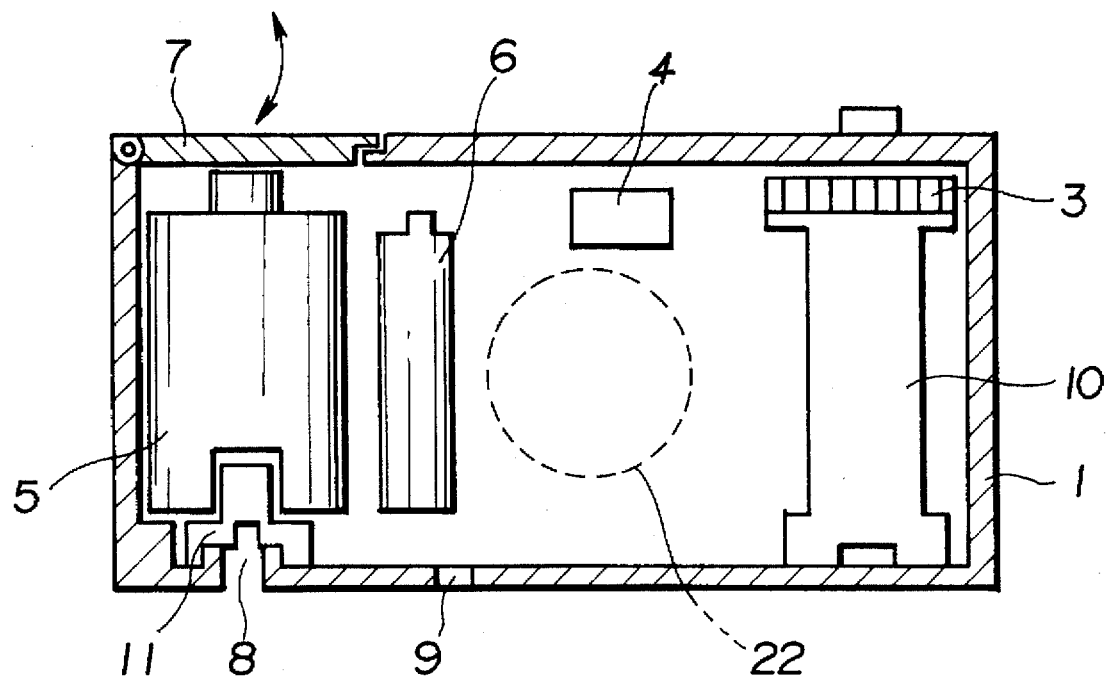
FIG. 2 is a sectional view showing major components of the camera of the first embodiment.
Figure 3:
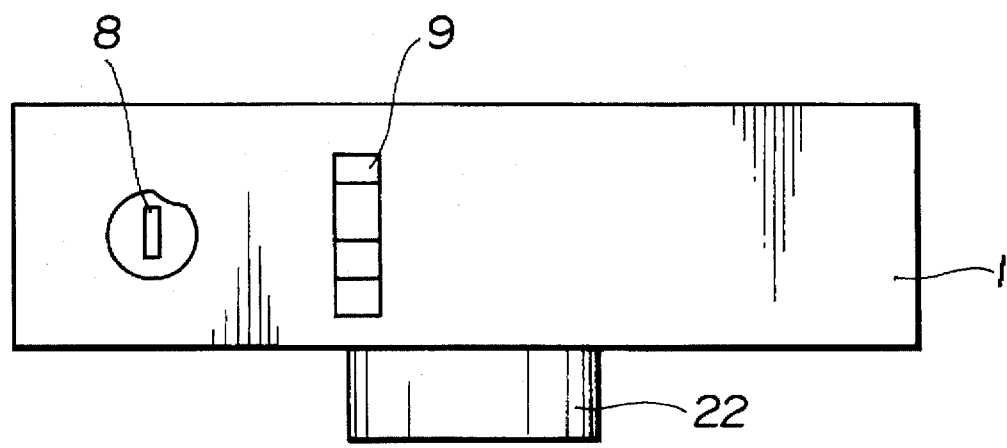
FIG. 3 is a bottom view showing the camera of the first embodiment.

FIG. 1 is an oblique view showing the appearances of a camera in accordance with the first embodiment of the present invention and a camera drive unit viewed from the backs of the camera and drive unit. FIG. 2 is a sectional view showing major components of the camera of the first embodiment. FIG. 3 is a bottom view showing the camera.

The camera of the first embodiment and the camera drive unit are characterized by such a mechanism that after a Patrone 5 is loaded in a camera body 1, when the camera body 1 is mounted on a camera drive unit 16, film is fed from the Patrone 5 using the driving force provided by the camera drive unit 16. The mechanism will be described with reference to the drawings.

The camera of the first embodiment has a release button 2 mounted in one lateral part of the top of the camera body 1. A lens 22 (See FIG. 2) is mounted on the front surface of the camera body 1. A take-up knob 3 is mounted along the upper edge of one lateral part of the back surface of the camera body 1. A viewfinder window 4 is formed in the center of the back surface of the camera body 1. Chambers in which the Patrone 5 and a battery 6 are stowed extend downward from the other part of the top of the camera body 1. The Patrone 5 and battery 6 are loaded and unloaded by opening a Patrone cover 7.

The Patrone 5 differs from a Patrone containing rolled film of a JIS-135 type but is a so-called film feed type Patrone of which a leader (tongue) does not come out. The camera body 1 itself does not therefore have a mechanism for feeding film from a Patrone.

As shown in FIGS. 2 and 3, a fork insertion hole 8 is bored at a position in the bottom of the camera body 1 on an extension of a spool axis of the Patrone 5. An R fork 11 to be engaged with the spool axis of the Patrone 5 is formed coaxially with the fork insertion hole 8 over the fork insertion hole 8 on the bottom of the camera body 1. An R fork 12, which will be described later, on the camera drive unit 16 is fitted from below into the fork insertion hole 8 and engaged with the R fork 11. With the rotation of the R fork 12, the fork 11 rotates. Thus, film is fed from the Patrone 5. Details will be described later.

Checker holes 9 are bored through the bottom of the camera body beyond the fork insertion hole 8 near the center of the bottom thereof. Checker pins 13, which will be described later, on the camera drive unit 16 are fitted into the checker holes 9. Thus, electric circuits, which are not shown, in the camera body 1 communicate with the camera drive unit 16. Details will be described later.

As shown in FIG. 2, a Patrone chamber for the Patrone 5 and a take-up spool 10 are arranged with the photographing lens 22 between them. The take-up spool 10 is coupled with the take-up knob 3. For normal photography, since film fed from the Patrone 5 has already been wound about the spool 10, a photographer turns the take-up knob 3 by a given quantity so as to wind in the film by one frame. Photography is then carried out.

Returning to FIG. 1, it is seen that the R fork 12 is mounted on the top of the camera drive unit 16 coaxially with the spool of the Patrone 5. When the camera body 1 is mounted on the camera drive unit 16, the R fork 12 is fitted into the fork insertion hole 8 bored in the bottom of the camera body (See FIG. 2). After being fitted into the fork insertion hole 8, the R fork 12 is engaged with the R fork 11 formed in the camera body 1. The Patrone 5 then rotates in a film feed direction so as to feed the film. The camera is now ready for photography.

The plurality of checker pins 13 are mounted on the top of the camera drive unit 16. When the camera body 1 is mounted on the camera drive unit 16, the checker pins 13 are fitted into the checker holes 9 (See FIGS. 2 and 3) bored through the bottom of the camera body 1. The tips of the checker pins 13 then come into contact with electrodes of electric circuits, which are not shown, in the camera body 1. Information fetched through the electrodes is inputted to a CPU 19 (FIG. 4) via a detection switch 31 that will be described later. Reference numeral 15 denotes a power cord for supplying power from a mains to the camera drive unit 16.

Figure 4:
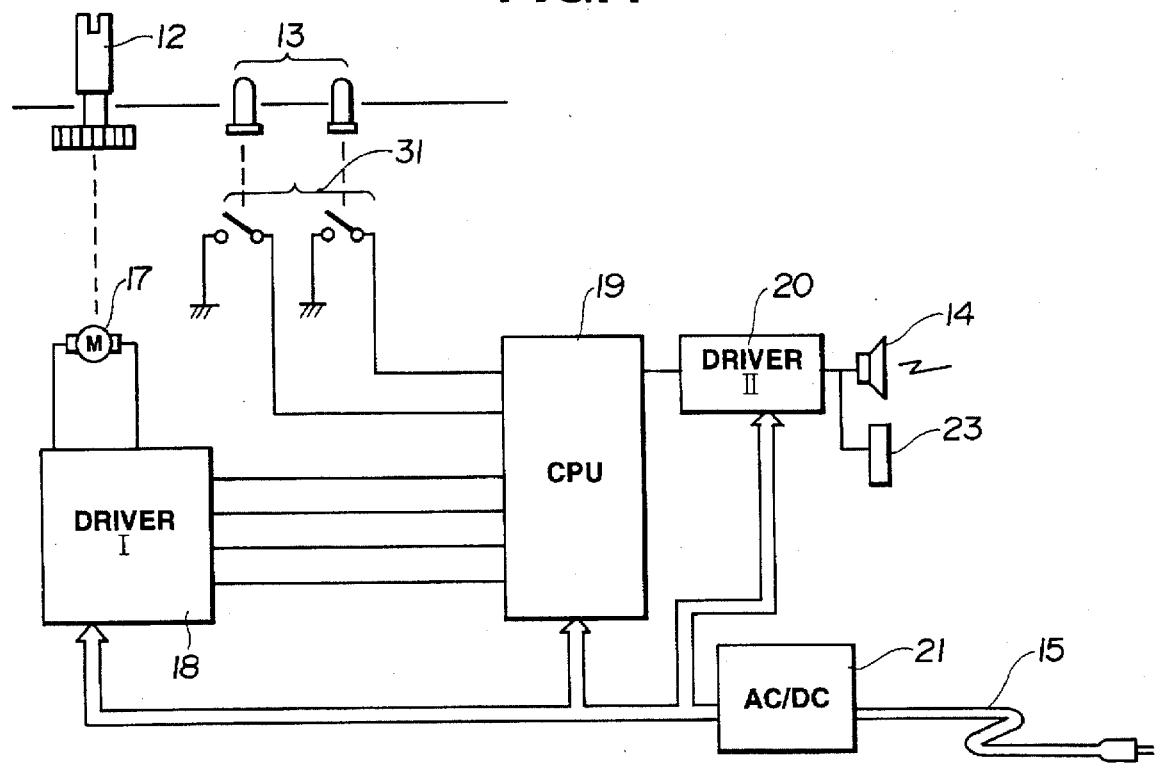
FIG. 4 is a block diagram showing circuitry of the drive unit for the camera of the first embodiment.

In this embodiment, the Patrone 5 is loaded in the camera body 1 at, for example, an assembly factory for the camera body 1. Thereafter, the camera body 1 is mounted on the camera drive unit 16, film is fed from the Patrone 5 and wound about the take-up spool 10, and then various checks are carried out. Referring to FIG. 4, the processes will be described according to a signal flow.

FIG. 4 is a block diagram showing circuitry of the camera drive unit 16.

The camera drive unit 16 receives power from, for example, a mains at an assembly factory for the camera body 1 over the power cord 15. The power is supplied to the circuits, CPU 19, a driver 20, and a motor driver 18 via an AC/DC converter 21.

When the camera body 1 is mounted on the camera drive unit 16, first, the CPU 19 uses the detection switch 31 to fetch information acquired from the camera body 1 by the checker pins 13; such as, a model name, presence or absence of a strobe, presence or absence of a zoom mechanism, presence or absence of a battery, and the frequency of photography or the number of Patrones loaded.

Based on the information, the CPU 19 determines whether a battery should be replaced. Depending on the frequency of photography, the CPU 19 controls the driver 20 so that information indicating that a specific component part should be replaced for repair is indicated by means of indicators 23.

After the component part has been replaced, the CPU 19 controls the motor driver 18 so that the motor 17 rotates in a film feed direction. Thus, film is fed from the Patrone 5 by a quantity of feed defined for a type of camera concerned. Thereafter, the film fed from the Patrone 5 is wound about the take-up spool 10.

When the foregoing processes are completed, given photographic preparations are completed. The CPU 19 then controls the driver 20 so that a Check Completed notification loudspeaker 14 sounds a beep indicating that photographic preparations are completed.

When a CPU is incorporated in the camera body 1, the CPU in the camera body 1 can communicate with the CPU 19 via the checker pins 13.

Thus, a camera is completed and enabled to perform photography. A camera in which a Patrone is used up for photography is returned to a camera shop, and mounted on the camera drive unit 16 again so that exposed film is rewound into the Patrone 5 by means of the motor 17. Thereafter, the Patrone cover 7 is opened in order to unload the Patrone 5. Preparations are then, as mentioned above, made for reusing the camera.

During communication between the camera body 1 and camera drive unit 16, shutter action, strobe action, film feed, and light leakage may be checked. Furthermore, it can be determined whether photography is completed. If photography is completed, film may not be fed or an alarm may be sounded. Moreover, it can be determined whether film feed is completed. If film feed is completed, film may not be fed or an alarm may be sounded.

Next, a counter for counting the number of Patrones loaded in the camera body 1 will be described with reference to FIGS. 5 and 6.

Figure 5:
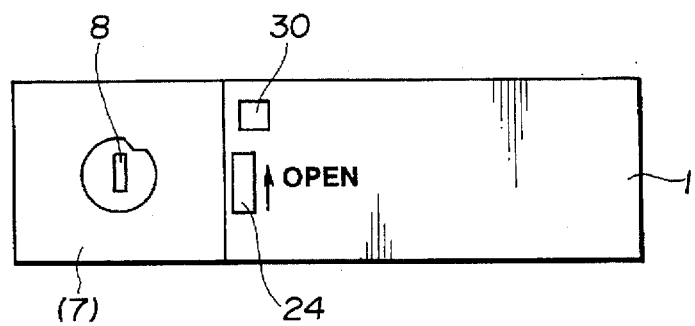
FIG. 5 is a bottom view showing a locking knob of a Patrone chamber cover in the camera of the first embodiment.
Figure 6:
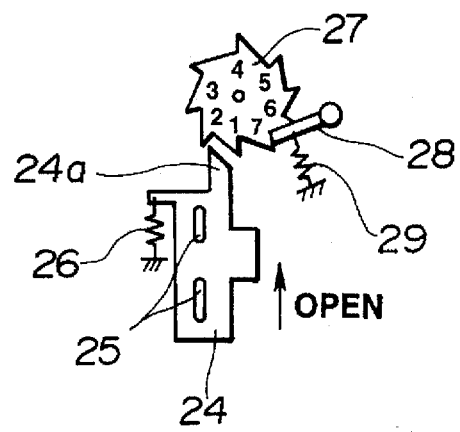
FIG. 6 is a front view showing major elements of a counter incorporated in the camera of the first embodiment.

FIG. 5 is a bottom view showing the bottom of the camera body 1. FIG. 6 is a front view showing major elements of a counter incorporated in the camera body 1.

The Patrone cover 7 is opened by sliding a Patrone cover knob 24 shown in FIG. 5 to an Open position. Every time the Patrone cover knob 24 is move to the Open position, the Patrone cover 7 is opened and a Patrone counter 27 is turned by one tooth. Thus, the frequency of opening the Patrone cover 7; that is, the number of Patrones loaded is counted.

Pins 25 are engaged with the Patrone cover knob 24 that is pulled in a direction opposite to an open direction by means of a knob spring 26. A knob claw 24a is formed to face the Patrone counter 27. A counter claw 28 is pressed against the Patrone counter 27 by means of a claw spring 29. A counter window 30 through which the reading of the Patrone counter 27 is observed is formed in the bottom of the camera body 1. A frame count indicator that is not shown is reset by rewinding film.

As mentioned above, according to the first embodiment, a camera dedicated to a film feed type Patrone need not have a film feed mechanism incorporated in a camera body. Eventually, a camera that is compact and lightweight, costs low, and has excellent portability can be made available.

Next, the second embodiment of the present invention will be described.

A camera of the second embodiment to be used in combination with a camera drive unit has not only the same capability as the first embodiment but also the ability to check a strobe mechanism.

Figure 7:
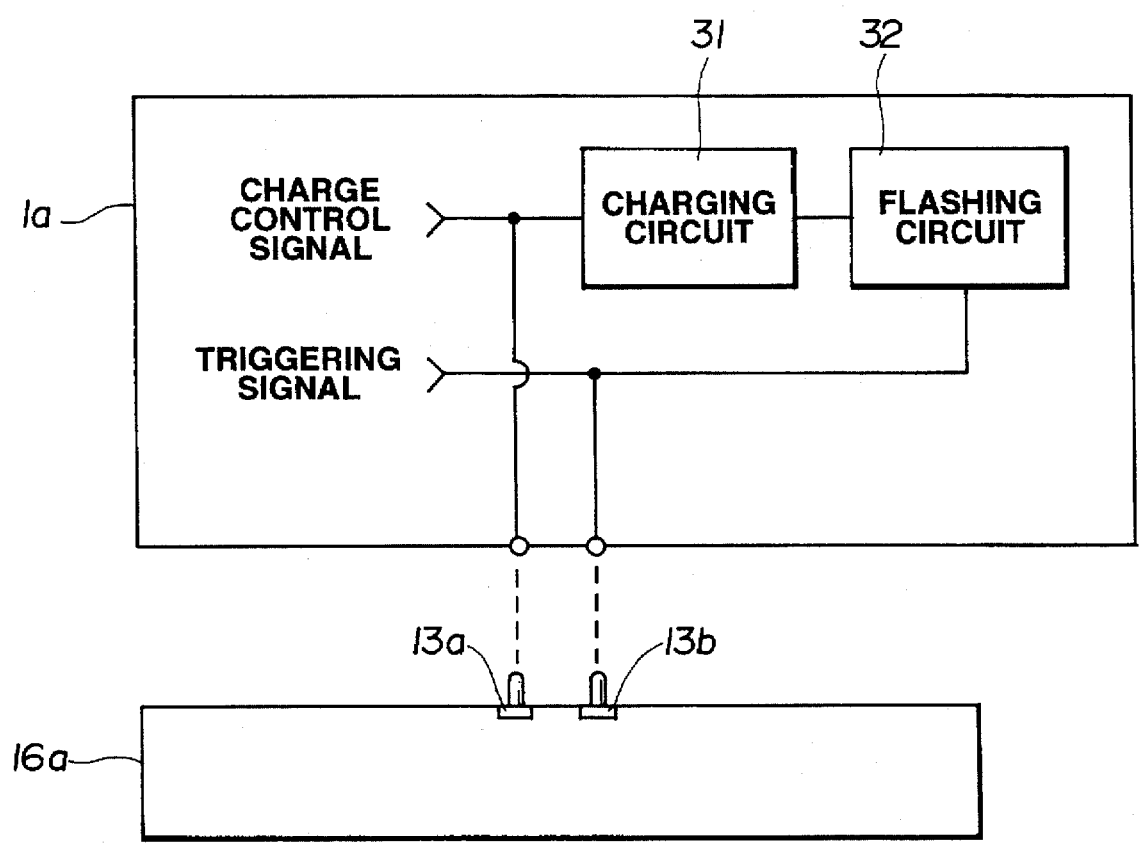
FIG. 7 is a block diagram showing a camera in accordance with the second embodiment of the present invention and major elements of a strobe check mechanism in a drive unit for the camera.

FIG. 7 shows a camera of the second embodiment and a camera drive unit. Specifically, FIG. 7 is a block diagram showing major elements of a strobe check mechanism in the second embodiment. The second embodiment has the same components and operation as the first embodiment except for the addition of strobe check mechanism. Only the difference therebetween will be described below.

As shown in FIG. 7, in the second embodiment, when a camera body 1a is mounted on a camera drive unit 16a, a charge control signal pin 13a and a triggering signal pin 13b are fitted into the checker holes 9. A charging circuit 31 incorporated in the camera body 1a is controlled according to a charge control signal, and a strobe flashing circuit 32 is checked synchronously with a triggering signal. The checker pins 13 are two (charge control signal pin 13a and triggering signal pin 13b) of four pins.

The second embodiment has not only the same advantage as the first embodiment but also the advantage of enabling checking of a strobe.

Next, the third embodiment of the present invention will be described.

A camera of the third embodiment to be used in combination with a camera drive unit has not only the same capability as the first embodiment but also the ability to check shutter action or light leakage.

Figure 8:
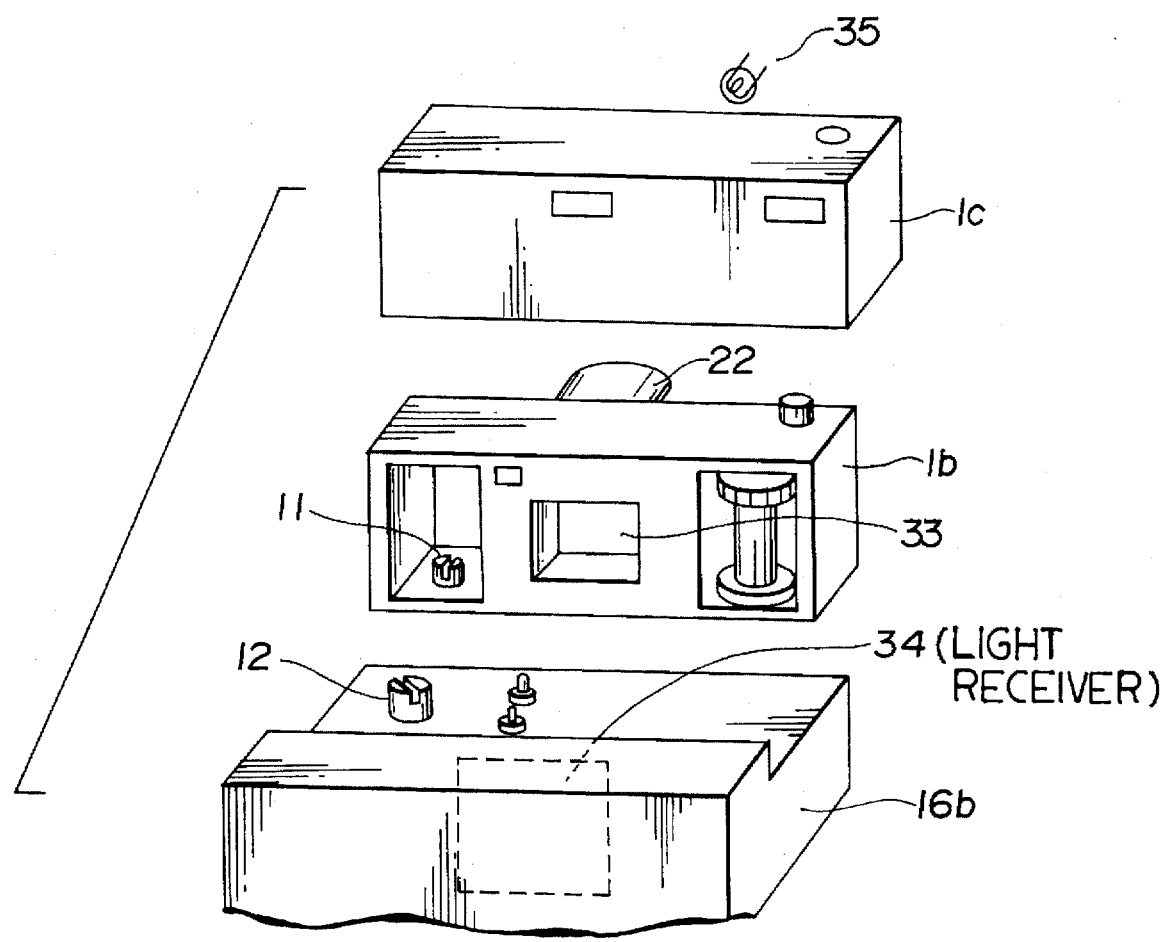
FIG. 8 is an oblique view showing the appearances of a camera in accordance with the third embodiment of the present invention and of a drive unit for the camera from the backs of the camera and drive unit.

FIG. 8 shows the camera of the third embodiment and a camera drive unit. Specifically, FIG. 8 is an oblique view showing major components responsible for checking shutter action and light leakage in accordance with the third embodiment. Aside from the mechanism of checking shutter action and light leakage, the third embodiment has the same components and operation as the first embodiment. Only the difference therebetween will be described below.

FIG. 8 shows a state set before the camera body 1b is encapsulated with a housing 1c. A picture size frame 33 is bared. The camera body 1b is mounted on the camera drive unit 16b in order to check shutter action and light leakage. A light receiver 34 is formed at a position on the camera drive unit 16b corresponding to the location of the picture size frame 33. A light emitter 35 is placed at a position corresponding to the location of the photographing lens 22. An amount of light emanating from the light emitter 35 is controlled by the CPU 19. An output of the light receiver 34 is input to the CPU 19.

For checking shutter action, the shutter is opened and closed. The CPU 19 then grasps the amount of light emanating from the light emitter 35 by checking the output of the light receiver 34. Based on the amount of light emanating from the light emitter 35, it is determined whether a shutter speed is controlled.

For checking light leakage, the shutter remains closed. The CPU 19 then grasps the amount of light emanating from the light emitter 35 by checking the output of the light receiver 34.

After the checking has been completed, the camera body 1b is provided with the housing 1c and Patrone 5. The camera drive unit 16b is actuated to feed film. Thus, a camera is completed.

The third embodiment has not only the same advantage as the first embodiment but also the advantage of checking shutter action and light leakage.

FIG. 9 is an oblique view showing the appearances of a camera in accordance with the fourth embodiment of the present invention and a charger used for the camera. FIG. 10 is a sectional view showing components of the camera of the fourth embodiment. FIG. 11 shows an appearance of the bottom of the camera.

As illustrated, a camera body 110 has a release button 111, a lens 112, a film take-up knob 113, and a viewfinder window 114. The camera body 110 has a Patrone cover 115 as part of the top thereof. When the Patrone cover 115 is opened, a Patrone chamber becomes visible. The Patrone cover 115 includes a lock means for preventing a user from opening the Patrone cover easily.

As shown in FIG. 10, a fork 116 for feeding or rewinding film is formed on the bottom of the Patrone chamber. When a Patrone 130 is loaded, the fork 116 is engaged with an axis of the Patrone 130. As shown in FIG. 11, the fork 116 has a ditch 116a in the center thereof so that it can be rotated externally of the camera body. A fork insertion hole 117 is bored in the camera body 110 so that part of the fork 116 is bared.

In FIG. 10, a take-up spool 118 for winding in film fed from the Patrone 130 is placed symmetrically to the Patrone chamber with the lens 112 between them.

A strobe flashing unit 119, electric circuits 120 including a flashing circuit responsible for flashing (See FIG. 12), and a rechargeable secondary battery 121 for energizing the electric circuit 120 are incorporated in the camera body 110. A land 122 serving as a charge terminal for use in charging the secondary battery 121 externally of the camera body is formed on the bottom of the camera body 110.

A checker land 123 serving as a terminal for use in conveying photographic information concerning a camera to a charger is formed in the vicinity of the fork insertion hole 117.

On a charger 140 having the capability of a drive unit for feeding film from the Patrone 130, checker pins 141 serving as a terminal for use in transferring information are formed in an area opposed to the checker land 123 on the camera body 110. A fork 142 serving as a drive shaft that enters the fork inserting hole 117 so as to engage with the fork 116 adjoins the checker pins 141. Charge pins 143 for use in charging the secondary battery 121 are formed in an area opposed to the charge land 122.

Figure 12:
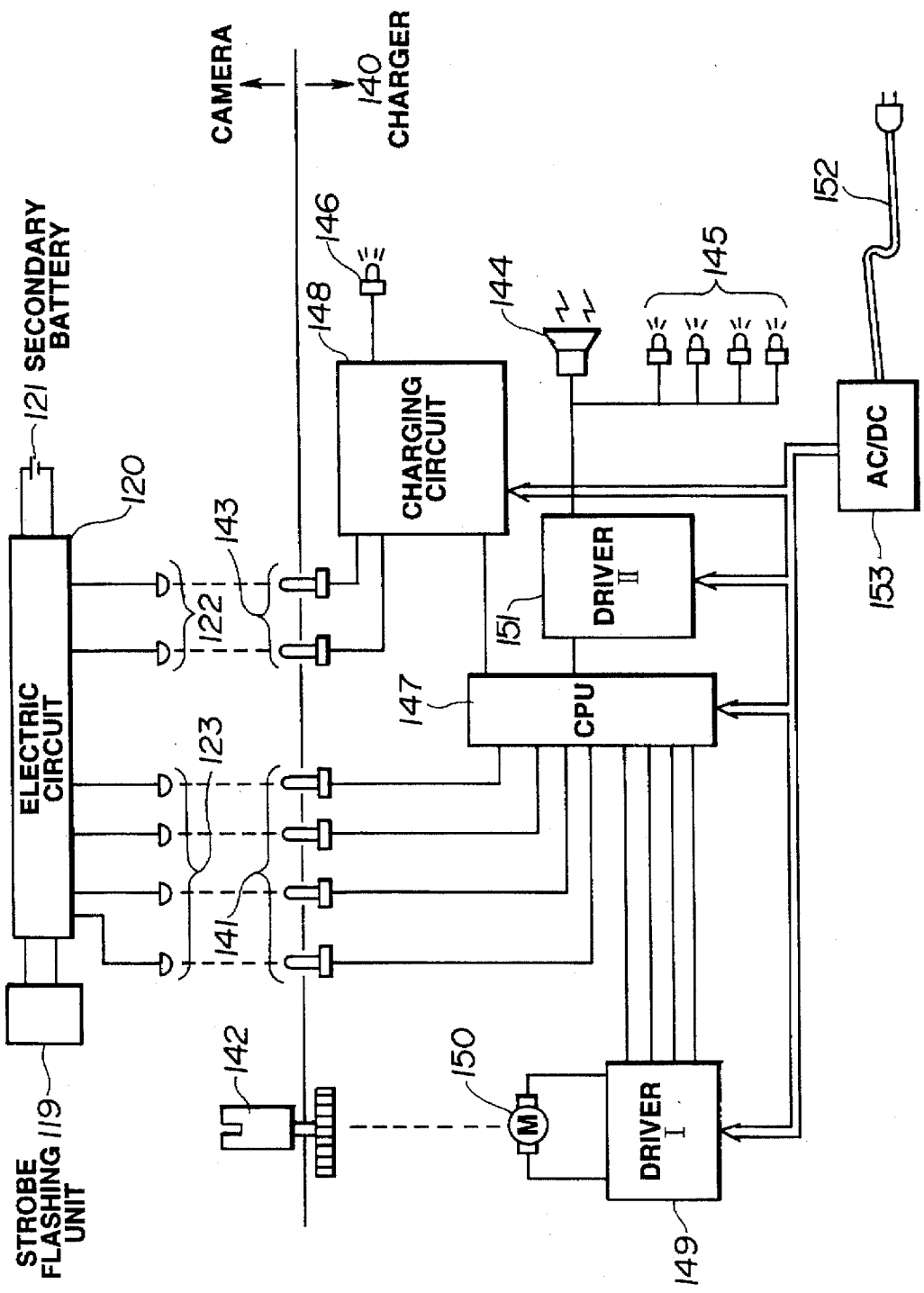
FIG. 12 is a block diagram showing the circuitries of the camera of the fourth embodiment and of the drive unit for the camera.

As shown in FIG. 12, the charger 140 includes a loudspeaker 144 serving as a notifying means for notifying the fact that film feed or the like is completed, and indicators 145 serving as indicating means for indicating photographic information or occurrence of a failure or for giving an alarm. Also included is a Charge Completed indicator 146 serving as a means for indicating that the secondary battery 121 has been charged.

The indicators 145 and Charge Completed indicator 146 are made using an appropriate electro-optic member such as liquid crystal or LEDs. An electro-optic member may be substituted for the loudspeaker 144.

The checker pins 141 are connected to a CPU 147. The CPU 147 communicates with the electric circuits 120 incorporated in the camera body 110 via the checker pins 141 and checker land 123. The CPU 147 then executes battery check or the like for the secondary battery 121. If necessary, the CPU 147 allows a charging circuit 148 to charge the secondary battery. The CPU 147 allows a motor driver (DRIVER I) 149 to drive a motor 150 so that the fork 142 rotates, and also allows a notification loudspeaker driver (DRIVER II) 151 to drive the loudspeaker 144 and indicators 145.

Power required for driving these circuit elements is supplied from an AC mains that is not shown over a power cord 152 by means of an AC/DC converter 153.

Next, the operation wielded by the aforesaid configuration will be described step by step.

In the fourth embodiment, the Patrone 130 is a so-called film feed type Patrone of which a leader does not come out. The camera body 110 does not therefore have a mechanism of feeding film.

At a camera shop or a photo processing shop for dealing with photographs or developing film, the Patrone cover 115 is opened and the Patrone 130 is loaded in the Patrone chamber. The camera body is then mounted on the charger 140. The fork 142 on the charger 140 is then fitted into the fork insertion hole 117 bored in the bottom of the camera body and engaged with the fork 116 formed in the camera body. At the same time, the checker pins 141 are coupled with the checker land 123 on the camera body and the charge pins 143 are coupled with the charge land 122.

The CPU 147 in the charger communicates with the electric circuits 120 including the secondary battery 121 in the camera body via the checker pins 141 and checker lands 123. The CPU 147 then executes battery check. If the result of battery check reveals that charge is required, the CPU 147 allows the charging circuit 148 to charge the secondary battery through the charge land 122 and charge pins 143.

When charge is completed, the Charge Completed indicator 146 notifies the fact. The number of exposed frames or the number of Patrones loaded is checked. When the number of exposed frames or Patrones loaded reaches a predetermined value, the indicators 145 are used to indicate that a component part should be replaced or it is time to conduct performance check. Such items as shutter action and strobe action are also checked.

When it is confirmed that camera operation is normal, the CPU 147 allows the motor driver 149 to rotate the motor 150 in the film feed direction. Thus, film is fed by a quantity permitting photography. When all photographic preparations are completed, the notification loudspeaker driver 151 drives the loudspeaker 144 so as to sound a Check Completed notification.

Thereafter, the charger 140 is dismounted from the camera body 110. At a camera shop, the camera is sold to a photographer or the like. At a photo processing shop, the camera is returned to a photographer or the like.

For photography, a photographer turns the take-up knob 113 so that the take-up knob 113 takes up film. Film is fed by one frame. A single-frame sensing mechanism that is not shown restricts further take-up of film. Thus, subsequent photography is enabled.

For strobe flashing, a flash button that is not shown is pressed. A capacitor, which is not shown, included in the electric circuits 120 is charged with power supplied from the secondary battery 121. When the release button 11 is pressed, the strobe flashing unit 119 flashes light synchronously with the opening of the shutter.

When all frames are exposed, the camera is handed to a photo processing shop as it is. At the photo processing shop, the camera body 110 is mounted on the charger 140, and the motor 150 is rotated in order to rewind film into the Patrone. When film rewind terminates, the loudspeaker 144 gives a sound. The Patrone cover 115 is then opened in order to unload the Patrone 130. The Patrone 130 is then set in a developing unit for film development. Thereafter, a new Patrone 130 is loaded. The charge in the secondary battery 121 and the camera operation are then checked. Other preparations are made for reusing the camera body as a camera.

Figure 13:
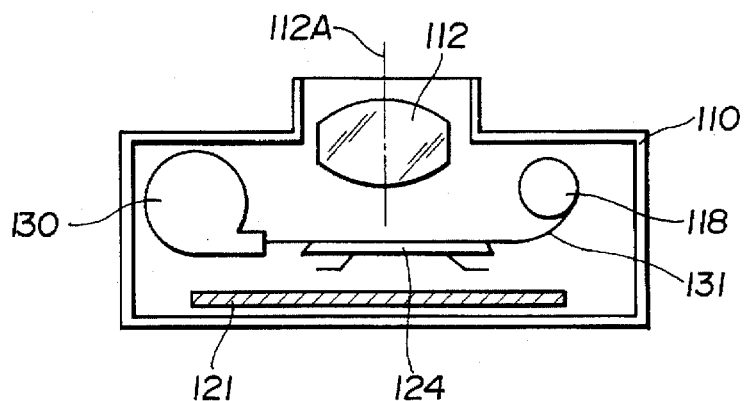
FIG. 13 is a sectional view showing another example of stowing a secondary battery in the camera of the fourth embodiment.

FIG. 13 is a sectional view showing the camera body 110, thus presenting another example of stowing the secondary battery 121 in the fourth embodiment.

The Patrone 130 lies on the left hand side of an optical axis 112A. The spool 118 for taking up film is placed on the opposite side of the optical axis 112A. The lens 112 for use in photography lies in the center of the camera body. A presser 124 is used to press film 131 against a film rail that is not shown. The secondary battery 121 is placed on a planar basis behind the presser 124.

Figure 14:
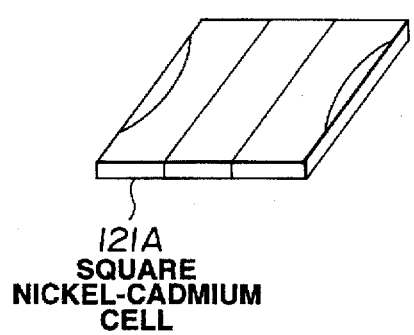
FIG. 14 is an oblique view showing an example of a secondary battery to be stowed in the camera of the fourth embodiment.
Figure 16:
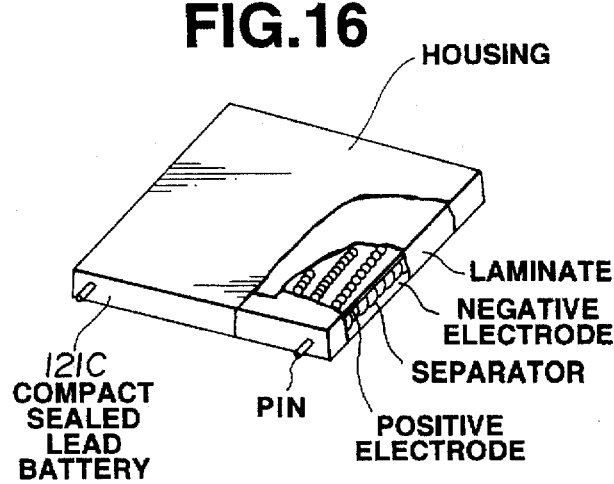
FIG. 16 is an oblique view showing yet another example of a secondary battery to be stowed in the camera of the fourth embodiment.
Figure 15:
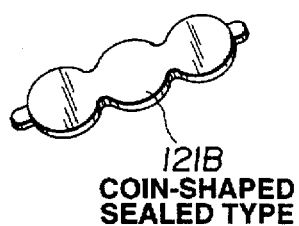
FIG. 15 is an oblique view showing another example of a secondary battery to be stowed in the camera of the fourth embodiment.

The secondary battery 121 is, for example, a square (plate type) nickel-cadmium cell 121A shown in FIG. 14, a coin-shaped sealed nickel-cadmium cell 121B shown in FIG. 15, or a thin battery such as a compact sealed lead battery 121C shown in FIG. 16.

Thus, the battery is placed behind the film 131 along the back surface of the camera body. A larger area therefore becomes available. A battery having a larger capacity becomes usable. Nevertheless, the camera body itself does not get very much larger. Layout permitting effective use of spaces can be realized.

Figure 17:
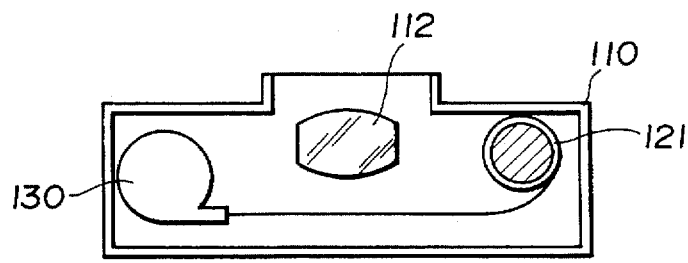
FIG. 17 is a sectional view showing yet another example of stowing a secondary battery in the camera of the fourth embodiment.

In FIG. 17, the secondary battery 121 is put in a spool axis. A cylinder-shaped secondary battery (for example, a nickel-cadmium cell, a nickel-hydrogen cell, a polymer cell, a lead battery, or a coin-shaped battery) is used as the secondary battery 121 and put in the hollow of the spool axis.

As mentioned above, the employment of a secondary battery obviates the necessity of replacing a battery. The location of a secondary battery can be determined freely. The shape of a secondary battery can be customized to some extent. This leads to a unique shape of a camera body unattainable from conventional layout.

In other words, according to the fourth embodiment, a secondary battery is substituted for a conventional battery having a specific shape; such as, an AA battery. Since the shape of the secondary battery can be determined arbitrarily, spaces can be used effectively. The location of a battery chamber can be determined with greater freedom. A compact camera ensues.

As for a primary battery, there is difficulty in determining whether the battery is reusable. At present, primary batteries are disposed of before discharged fully. This is a waste of resources. When secondary batteries can be recharged more easily, they can be recycled more readily.

As described so far, according to the first to fourth embodiments, a camera dedicated to a so-called film feed type Patrone can be materialized as a compact and inexpensive camera and camera drive unit.

In the present invention, it is apparent that a wide range of different working modes can be formed on the basis of the invention without departing from the spirit and scope of the invention. This invention is not restricted to any specific embodiments but is limited only by the appended claims.

What is claimed is:

1. A camera dedicated to a film feed type Patrone having a rotatable spool and a film which is wound about said spool and is fully contained in the Patrone, the camera comprising:

an aperture defining a photographing film frame;

a chamber for storing said Patrone;

a take-up spool spaced from said chamber for winding a film fed from said Patrone:

said aperture being positioned in a space between said chamber and said take-up spool;

an opening in said camera extending between one end of said chamber and an exterior surface of the camera for exposing one of an end of the Patrone spool for releasable engagement with an external drive and a coupling arranged in said opening having one end for engaging one end of the Patrone spool and another end for releasable engagement with an external drive for feeding film out of the Patrone and across said aperture toward said take-up spool and for rewinding film in said Patrone thereby eliminating the need for providing a motor in the camera; and driving means for driving said take-up spool to wind film sent from said Patrone about said take-up spool.

2. A camera according to claim 1, wherein said driving means includes an operating member accessible along an external surface of said camera for manual operation by a photographer for winding film about the take-up spool.

3. In combination, a camera dedicated to a film feed-type Patrone and an apparatus for detachable coupling with the camera;

said camera having a chamber for receiving a film feed-type Patrone having a rotatable spool and film wound about said rotatable spool and fully contained within said Patrone;

an aperture for photography and a take-up spool for winding film sent to the take-up spool from said film feed-type Patrone;

said aperture being positioned between said chamber and said take-up spool;

said camera having an opening for exposing one of an end of said Patrone spool to one surface of said camera and a coupling having one end engaging said one end of said Patrone spool and another end exposed along said camera surface;

said apparatus having a motor-driven driving member for releasable engagement with one of said one end of said Patrone spool and said other end of said coupling for feeding a predetermined amount film out of said Patrone and across said aperture toward said take-up spool to prepare said camera for a photographing operation and for rewinding film into said Patrone preparatory to removal for processing.

4. The combination of claim 3 wherein said apparatus totally eliminates the need for providing a motor within said camera.

5. The combination of claim 3 wherein said apparatus is coupled only to said Patrone spool when coupled to said camera, said take-up spool being operated totally independent of said apparatus and said Patrone spool.

6. A camera system comprising a camera dedicated for use with a film feed-type Patrone and a peripheral unit for releasable coupling with the camera:

said external unit including a mechanism for releasable coupling with a rotatable spool of said film feed-type Patrone mounted within a chamber in said camera for rotating said spool and sending film out of said Patrone toward a film take-up mechanism and for rewinding film into said Patrone; and said film take-up mechanism including manually operable means for winding film sent from the Patrone.

7. The camera system of claim 6 wherein said external unit totally eliminates the need for providing a motor in said camera.

8. The camera system of claim 6 wherein the external unit is coupled only to said Patrone spool when releaseably coupled to said camera, said take-up mechanism being operated totally independent of said external unit and said Patrone spool.

9. A method for operating a camera and a detachable motor drive unit, said camera being comprised of a camera body having a chamber for receiving a film feed-type Patrone having a film fully contained within the Patrone and wound about a rotatable spool, a take-up chamber, and a take-up mechanism for taking up film delivered to the take-up chamber from said Patrone and a photogrpahing aperture arranged between said Patrone chamber and said take-up chamber; a rotatable coupling having one end coupled with the spool of a Patrone placed in the Patrone chamber and another end exposed along one surface of the camera body;

said motor drive mechanism comprising a driving means having a member arranged to be coupled with said exposed coupling end, said method comprising the steps of:

(a) opening a lid on said camera to gain access to said Patrone chamber;

(b) inserting a film feed-type Patrone, in which the film is fully contained within the Patrone, into said Patrone chamber;

(c) closing said lid;

(d) coupling the drive member of the drive means to said exposed coupling;

(e) operating said drive means to advance film fully contained within said film feed-type Patrone out of said Patrone, and across said aperture and into said take-up chamber to enable said take-up mechanism to take-up the film in the take-up chamber; and (f) detaching said drive mechanism from said camera whereby said camera is ready for use for photographing purposes independently of said driving mechanism.

10. A method for operating a camera and a detachable motor drive unit, said camera being comprised of a camera body having a Patrone chamber for receiving a film feed-type Patrone having a film fully contained within the Patrone and wound about a rotatable spool, a take-up chamber and a photographing aperture arranged between said Patrone chamber and said take-up chamber, a take-up mechanism for taking up film delivered to the take-up chamber from said Patrone; a rotatable coupling having one end coupled with the spool of a Patrone placed in the Patrone chamber and another end exposed along one surface of the camera body, said motor drive mechanism comprising a driving means having a member arranged to be coupled with said exposed coupling, said method comprising the steps of:

(a) coupling the drive member of the drive means to said exposed coupling;

(b) operating the drive means to wind film wound on about the take-up spool back into the Patrone in said chamber;

(c) opening a lid on said camera to gain access to said Patrone chamber;

(d) removing the Patrone in said chamber;

(e) inserting a second film feed-type Patrone, in which the film is fully contained within the Patrone, into said Patrone chamber;

(f) closing said lid;

(g) operating said drive means to advance film fully contained within said film feed-type Patrone out of said Patrone, and across said aperture and into said take-up chamber to enable said take-up mechanism to take-up the film in the take-up chamber; and (h) detaching said drive mechanism from said camera whereby said camera is ready to perform photographing independently of the driving mechanism.

* * * * *